(12) United States Patent
Won

(10) Patent No.: US 9,622,210 B2
(45) Date of Patent: Apr. 11, 2017

(54) METHOD AND APPARATUS FOR ESTIMATING PROXIMITY OF FEMTO CELL IN WIRELESS COMMUNICATION SYSTEM

(71) Applicant: Samsung Electronics Co., Ltd., Suwon-si, Gyeonggi-do (KR)

(72) Inventor: Hyungsuk Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 14/585,858

(22) Filed: Dec. 30, 2014

(65) Prior Publication Data

US 2015/0195808 A1    Jul. 9, 2015

(30) Foreign Application Priority Data

Jan. 3, 2014    (KR) .......................... 10-2014-0000533

(51) Int. Cl.
*H04L 12/26* (2006.01)
*H04W 64/00* (2009.01)
*H04W 24/10* (2009.01)

(52) U.S. Cl.
CPC ......... *H04W 64/003* (2013.01); *H04W 24/10* (2013.01); *H04W 64/006* (2013.01)

(58) Field of Classification Search
CPC .. H04W 64/003; H04W 24/10; H04W 64/006
See application file for complete search history.

(56) References Cited

U.S. PATENT DOCUMENTS

| | | | |
|---|---|---|---|
| 8,086,236 B2* | 12/2011 | Wu | H04W 36/14 370/331 |
| 8,665,833 B2 | 3/2014 | Iwamura et al. | |
| 2010/0323633 A1 | 12/2010 | Pani et al. | |
| 2012/0196647 A1 | 8/2012 | Chen et al. | |
| 2013/0182583 A1* | 7/2013 | Siomina | H04W 24/10 370/252 |

FOREIGN PATENT DOCUMENTS

| | | |
|---|---|---|
| KR | 10-2012-0040268 A | 4/2012 |
| KR | 10-2012-0043075 A | 5/2012 |
| KR | 10-1151913 B1 | 5/2012 |
| KR | 10-1266044 B1 | 5/2013 |

\* cited by examiner

*Primary Examiner* — Afshawn Towfighi
(74) *Attorney, Agent, or Firm* — Jefferson IP Law, LLP

(57) ABSTRACT

A method and an apparatus for estimating femto cell proximity by a User Equipment (UE) in a wireless communication system are provided. The method includes receiving, by the UE, a measurement report request message from an eNodeB (eNB), estimating the femto cell proximity based on user context information, and transmitting, to the eNB, a measurement report message including a result of the estimation.

13 Claims, 9 Drawing Sheets

FIG. 1
(RELATED ART)

| macro cell 100 | macro cell 110 |
|---|---|
| #100 | #201<br>#210<br>#224<br>⋮ |
| #101 | #202<br>#214<br>⋮ |
| ⋮ | ⋮ |

FIG. 3

| date | current time | position | movement speed | movement distance | ... |
|---|---|---|---|---|---|
| 2000. 1. 1. | 9:00 AM | 365.642 | 60km | 100m | ... |
| 2000. 1. 1. | 10:00 AM | 365.802 | 0km | 0m | ... |
| 2000. 1. 1. | 8:00 AM | 425.410 | 2km | 10m | ... |
| ... | ... | ... | ... | ... | ... |

FIG. 6

| position | NAME | stay time | existence or nonexistence of CSG cell |
|---|---|---|---|
| 306.823 | OFFICE | 3hours | ○ |
| 330.241 | LIBRARY | 4hours | × |
| 392.114 | HOUSE | 5hours | ○ |
| ⋮ | ⋮ | ⋮ | ⋮ |

METHOD AND APPARATUS FOR ESTIMATING PROXIMITY OF FEMTO CELL IN WIRELESS COMMUNICATION SYSTEM

CROSS-REFERENCE TO RELATED APPLICATION(S)

This application claims the benefit under 35 U.S.C. §119 (a) of a Korean patent application filed on Jan. 3, 2014 in the Korean Intellectual Property Office and assigned Serial number 10-2014-0000533, the entire disclosure of which is hereby incorporated by reference.

TECHNICAL FIELD

The present disclosure relates to a wireless communication system. More particularly, the present disclosure relates to a method and an apparatus for estimating a proximity of a femto cell in a wireless communication system.

BACKGROUND

Previously, mobile communication systems were developed to provide reliable voice services for various users. However, these mobile communication systems have gradually expanded their service area to include data services as well as voice services and have specifically been developed to provide high speed data services. However, this need for high speed data services causes a problem, since resources are lacking and users now demand higher speed services in the current mobile communication systems. Accordingly, a more improved mobile communication system is needed.

When a handover is made from a macro cell to a Closed Subscriber Group (CSG) cell, an eNodeB (eNB) transmits a measurement report request message to a User Equipment (UE). Further, when the eNB transmits the measurement report request message having "measurement type=CSG proximity detection", the UE transmits a measurement report message according to a determination of whether or not a femto cell is closely located. For example, when it is determined that the femto cell is near, the UE transmits a measurement report message including an "entering" proximity indication to the eNB. In contrast, when it is determined that the femto cell is not near, the UE transmits a measurement report message including a "leaving" proximity indication to the eNB.

For a proximity indication report to the eNB by the UE, it should be determined whether the UE is located within a femto cell service radius or whether the UE is beyond the femto cell service radius. Such a determination method is referred to as proximity estimation.

However, a proximity estimation method of the related art is problematic in that it is very unreliable.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for estimating femto cell proximity by using user context information in a wireless communication system.

In accordance with an aspect of the present disclosure, a method of estimating femto cell proximity by a User Equipment (UE) in a wireless communication system is provided. The method includes receiving, by the UE, a measurement report request message from an eNodeB (eNB), estimating the femto cell proximity based on user context information, and transmitting, to the eNB, a measurement report message including a result of the estimation.

In accordance with another aspect of the present disclosure, a UE for estimating femto cell proximity in a wireless communication system is provided. The UE includes a wireless communication unit configured to transmit/receive a signal to/from an eNB, and a control unit configured to receive a measurement report request message from the eNB, to estimate the femto cell proximity based on user context information, and to transmit, to the eNB, a measurement report message including a result of the estimation.

According to a method of estimating femto cell proximity according to the present disclosure, there is no requirement to store information on macro cells adjacent to visited femto cells and also it is possible to increase the accuracy of the estimation of the femto cell proximity. Further, according to the present disclosure, it is possible to properly deal with a condition according to femto cell addition or deletion. In addition, according to the present disclosure, through the use of user context information, a number of proximity estimations is reduced and thus the number of proximity indication reports is reduced, thereby reducing consumption of uplink resources.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates an example in which a User Equipment (UE) stores history information according to the related art;

FIG. 3 illustrates an example of data collected by a UE according to an embodiment of the present disclosure;

FIG. 6 illustrates user context information according to an embodiment of the present disclosure;

DETAILED DESCRIPTION

Figure 2:
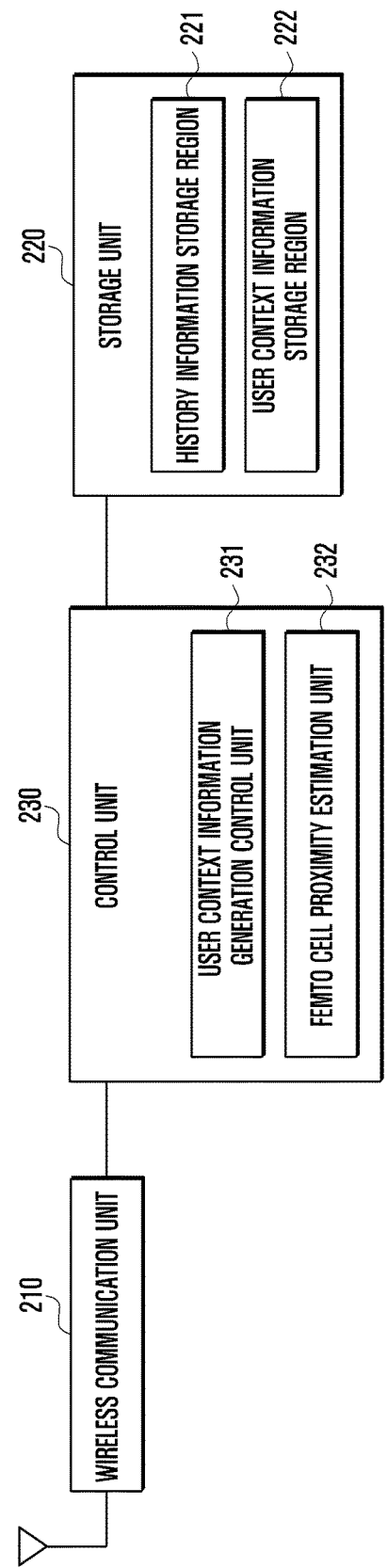
FIG. 2 is a block diagram illustrating an internal structure of a UE according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to various embodiments as described below in detail in conjunction with the accompanying drawings. However, the present disclosure is not limited to the various embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical functions. It should also be noted that in some alternative implementations, the functions noted in the blocks may occur out of the order in which they are illustrated. For example, two blocks shown in succession may in fact be executed substantially concurrently or the blocks may sometimes be executed in the reverse order, depending upon the functionality involved.

As used herein, the term "unit" or "module" refers to a software element or a hardware element, such as a Field Programmable Gate Array (FPGA) or an Application Specific Integrated Circuit (ASIC), which performs a predetermined function. However, the term "unit" or "module" does not always have a meaning limited to software or hardware. The term "unit" or "module" may be constructed either to be stored in an addressable storage medium or to execute one or more processors. Therefore, the term "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the term "unit" or "module" may be either combined into a smaller number of elements, "unit", or "module" or divided into a larger number of elements, "unit", or "module". Moreover, the elements and "units" or "modules" may be implemented to reproduce one or more Central Processing Units (CPUs) within a device or a security multimedia card.

A proximity estimation method of the related art uses information on a macro cell near a User Equipment (UE). For example, when the UE first visits a femto cell, the UE stores information on macro cells adjacent to the UE.

FIG. 1 illustrates an example in which a UE stores history information according to the related art.

Referring to FIG. 1, when an identifier of a femto cell (for example, a Closed Subscriber Group (CSG) Identification (ID)) which the UE visits is #201, #210 or #224, #100 corresponding to information on a macro cell 100 near the UE is recorded as history information. Referring to FIG. 1, a plurality of femto cells may be included in one macro cell 110. Further, for example, when an identifier of a femto cell which the UE visits is #202 or #214, #101 corresponding to information on the macro cell 100 near the UE is recorded as history information Thereafter, in a case where the UE re-visits a macro cell, if there is data stored as history information with regard to the currently visited macro cell, then the UE estimates that a femto cell exists within a service radius of the currently visited macro cell.

However, a service radius of the femto cell, the range of which is measured in tens of meters, is relatively smaller than the service radius of the macro cell, the range of which may be several to tens of kilometers. Accordingly, the method of the related art based on the macro cell can reduce the number of proximity estimations and also reduce the number of proximity indication reports to transmit result information, thereby reducing an uplink load in comparison with a method of performing the proximity estimation whenever the femto cell appears.

However, due to the large difference between service radiuses of the femto cell and the macro cell, even though the UE is within the service radius of the corresponding macro cell, the UE may actually be outside the service radius of the femto cell.

Accordingly, a method of determining, according to the related art, whether the UE is near the femto cell through macro cell information may have low accuracy.

Further, a method of estimating femto cell proximity by using only history information cannot estimate a situation where femto cells are frequently added or deleted due to the characteristic of the femto cell even though highly accurate data such as Global Positioning System (GPS) data is used rather than the macro cell information.

The present disclosure has been made to address the above problem and an aspect of the present disclosure is to provide a method of estimating femto cell proximity and increasing the estimation accuracy regardless of a storage of history information by which the femto cell proximity is estimated or regardless of the accuracy of information used when the history information is stored.

FIG. 2 is a block diagram illustrating an internal structure of a UE according to an embodiment of the present disclosure.

Referring to FIG. 2, a UE according to the present disclosure may include a wireless communication unit 210, a storage unit 220, and a control unit 230.

The wireless communication unit 210 performs a function of transmitting/receiving data for wireless communication of the UE. The wireless communication unit 210 may include a Radio Frequency (RF) transmitter for up-converting and amplifying a frequency of a transmitted signal and an RF receiver for low noise-amplifying a received signal and down-converting a frequency. Further, the wireless communication unit 210 may receive data through a wireless channel to output the received data to the control unit 230, and may transmit data output from the control unit 230 through the wireless channel. The wireless communication unit 210 according to an embodiment of the present disclosure may receive a measurement report request message transmitted from the eNodeB (eNB) and transmit a response message to the eNB.

The storage unit 220 may serve to store a program and data required for operations of the UE and may be divided into a program region and a data region. According to an embodiment of the present disclosure, the storage unit 220 may further includes a history information storage region 221 and a user context information storage region 222.

The history information storage region 221 may store position information of the macro cell and one or more femto cells located within the service radius of the macro cell, or femto cell related information. The history information stored in the history information storage region 221 may have a table form as illustrated in FIG. 1. The UE may accumulate and continuously store the history information, store a preset number of pieces of history information, and/or store history information during a preset period.

The user context information storage region 222 stores collected user context information. The user context information may be collected through an intervention of the user and/or collected without the intervention of the user.

For example, as the user context information, data such as current time, position, movement speed, movement distance and the like may be collected through a position acquisition protocol without any intervention by the user. The data may be collected by a request as necessary, periodically and/or aperiodically. The position acquisition protocol may be, for example, a Long Term Evolution (LTE) Positioning Protocol (LPP). The LPP may include a method of acquiring position information of the UE based on a position of the eNB and a method of acquiring position information of the UE based on a satellite such as a GPS.

Further, according to an embodiment of the present disclosure, the user context information may include information related to a current position through intervention by the user. For example, as the current position, information indicating home or office may be acquired.

In order to perform the above described functions, the control unit 230 may further include a user context information generation control unit 231 and a femto cell proximity estimation unit 232.

The user context information generation control unit 231 generates the user context information and stores the generated user context information in the storage unit 220. The user context information generation control unit 231 may continuously record information on the current date, time, day of the week (not shown), position, movement speed, movement distance and the like in the UE and generate user context information based on the recorded information. The user context information may include position information of the UE and the time during which the UE stays in a place corresponding to the position information. Further, when the user intervenes, the user context information may further include a name corresponding to the position information and information on whether the femto cell is installed in a place corresponding to the position information.

The femto cell proximity estimation unit 232 estimates whether the UE is near the femto cell based on the user context information. That the user is near the femto cell may mean that an interval between the UE and the femto cell is within a preset distance.

FIG. 3 illustrates an example of data collected by a UE according to an embodiment of the present disclosure.

Referring to FIG. 3, a UE may collect data to acquire user context information. For example, the UE may continuously record information on the current date, time, day of the week (not shown), position, movement speed, movement distance and the like.

Figure 4:
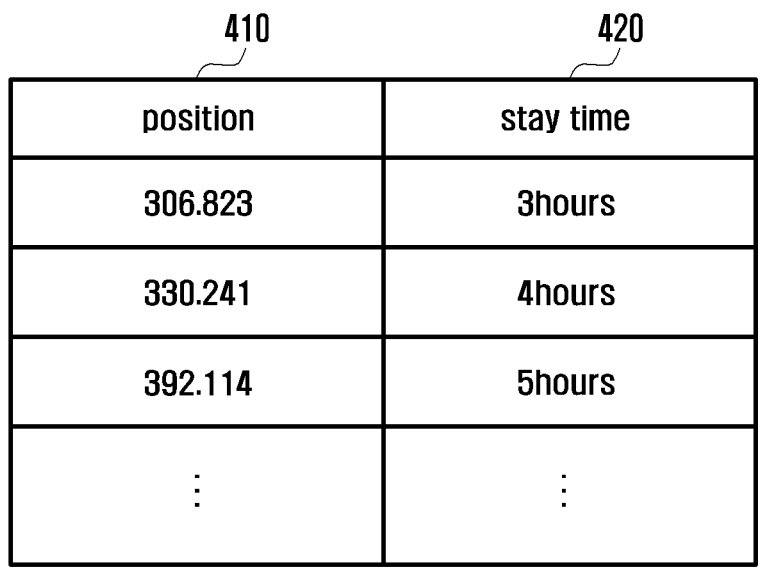
FIG. 4 illustrates user context information according to an embodiment of the present disclosure.

Further, the UE may acquire the user context information as illustrated in FIG. 4 based on the recorded data according to an embodiment of the present disclosure.

FIG. 4 illustrates user context information according to an embodiment of the present disclosure.

Referring to FIG. 4, based on the collected data illustrated in FIG. 3, a UE may record, as user context information, position information 410 and time (e.g., stay time) information 420 indicating a time during which the UE stays in a place corresponding to the position information. The user context information is stored in the user context information storage region 222 as illustrated in FIG. 2.

Further, as described above, the user context information may include information related to the current position according to the intervention of the user.

Figure 5:
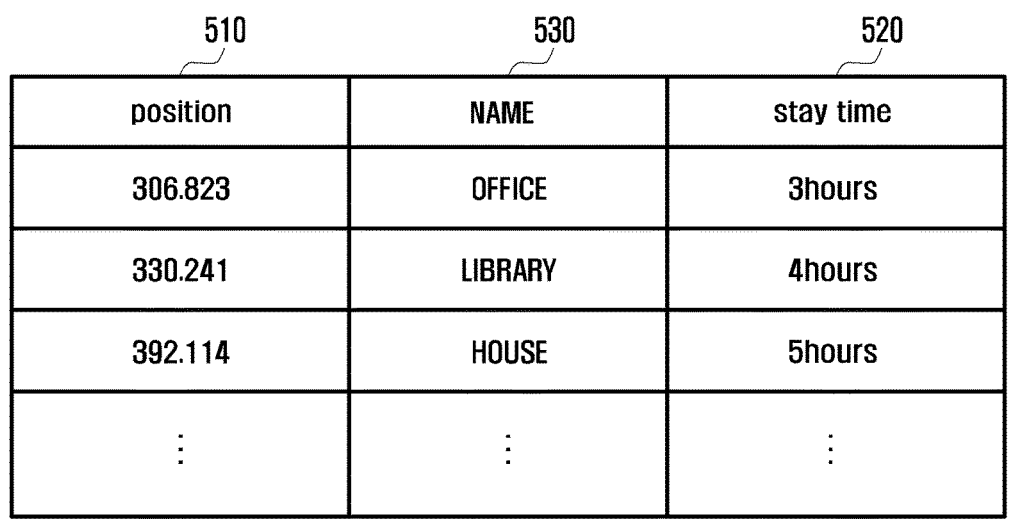
FIG. 5 illustrates user context information according to an embodiment of the present disclosure.

FIG. 5 illustrates user context information according to an embodiment of the present disclosure.

Referring to FIG. 5, when user context information including position information 510 and time (e.g., stay time) information 520 indicating a time during which the UE stays in place corresponding to the position information are acquired, the user may configure a name 530 of the position information as information related to the position information 510. Referring to FIG. 5, the name of the position information may include office, library, and house/home.

Alternatively, according to another embodiment of the present disclosure, the user context information may include other information related to the current position according to the intervention by the user.

FIG. 6 illustrates user context information according to an embodiment of the present disclosure.

Referring to FIG. 6, when user context information, including position information 610, a user setting name 620 corresponding to the position information, and time (e.g., stay time) information 630 indicating a time during which the UE stays in a place corresponding to the position information is acquired, the user may configure information (e.g., existence or nonexistence of a CSG cell) 640 indicating whether a femto cell is installed in the place corresponding to the position information as information related to the position information 610.

Meanwhile, the storage unit 220, as illustrated in FIG. 2, may or may not store the user context information as necessary.

The control unit 230, as illustrated in FIG. 2, controls a signal flow between blocks to allow the UE to operate according to an embodiment of the present disclosure. Specifically, the control unit 230 may control a series of processes of estimating femto cell proximity by using user context information and reporting the estimation to the eNB. The control unit 230 includes a function of estimating the femto cell proximity and may use at least one of the collected user context information or the stored history information for the estimation. As described below, according to a method of estimating the proximity, the stored history information may or may not be used for the estimation.

In order to perform the above described functions, the control unit 230 may further include the user context information generation control unit 231 and the femto cell proximity estimation unit 232 as illustrated in FIG. 2.

As discussed above, the user context information generation control unit 231 generates the user context information and stores the generated user context information in the storage unit 220. The user context information generation control unit 231 may continuously record information on the current date, time, day of the week (not shown), position, movement speed, movement distance and the like in the UE and generate user context information based on the recorded information. The user context information may include position information of the UE and the time during which the UE stays in a place corresponding to the position information. Further, when the user intervenes, the user context information may further include a name corresponding to the position information and information on whether the femto cell is installed in a place corresponding to the position information.

Furthermore, as discussed above, the femto cell proximity estimation unit 232 estimates whether the UE is near the femto cell based on the user context information. That the user is near the femto cell may mean that an interval between the UE and the femto cell is within a preset distance.

In the user context information, the movement information may be acquired using (an LPP as necessary) a GPS included in the UE. Alternatively, the user context information may be configured by simple information such as the time during which the UE stays in the macro cell.

The femto cell proximity estimation unit 232 determines whether the user can use the femto cell based on the collected user context information. According to an embodiment of the present disclosure, the femto cell proximity estimation unit 232 may determine whether the femto cell can be used based on the user context information and current position information of the UE.

Further, when it is determined that a possibility of using the femto cell is high, the femto cell proximity estimation unit 232 estimates that the femto cell is near and reports a proximity indication. A reference by which it is determined whether the UE uses the femto cell may be configured using available user context information as necessary.

For example, a method of estimating femto cell proximity according to an embodiment of the present disclosure will be described below.

For example, a particular position or place in which the user stays for a predetermined time or longer occupies more time in comparison with all positions or places which the UE has visited in all movement paths. When there is little movement and a long stay time in the user context information, the femto cell proximity estimation unit 232 determines the location to be home or office where the user stays for a long time and thus determines that the possibility of using the femto cell is high. Based on a result of the determination, the femto cell proximity estimation unit 232 estimates the femto cell proximity.

The method according to the above-described embodiment may be properly used even when there is no stored history information or when there is stored history information but the corresponding femto cell is newly added or deleted.

Further, a method of estimating femto cell proximity according to an embodiment of the present disclosure will be described below.

In the above-described embodiment, it is assumed that the history information is stored and the user context information is acquired. The femto cell proximity estimation unit 232 may use both the stored history information and the user context information for estimating the femto cell proximity.

When it is determined that the femto cell previously exists based on the stored history information and it is determined that the possibility of using the femto cell is high based on the user context information at the same time, the femto cell proximity estimation unit 232 estimates the existence of the femto cell and reports the proximity indication.

Meanwhile, although the control unit and function blocks perform separate functions in the internal structure of the UE, the present disclosure is not limited thereto. For example, the functions performed by the femto cell proximity estimation unit 232 of the UE may be performed by the control unit 230.

Figure 7:
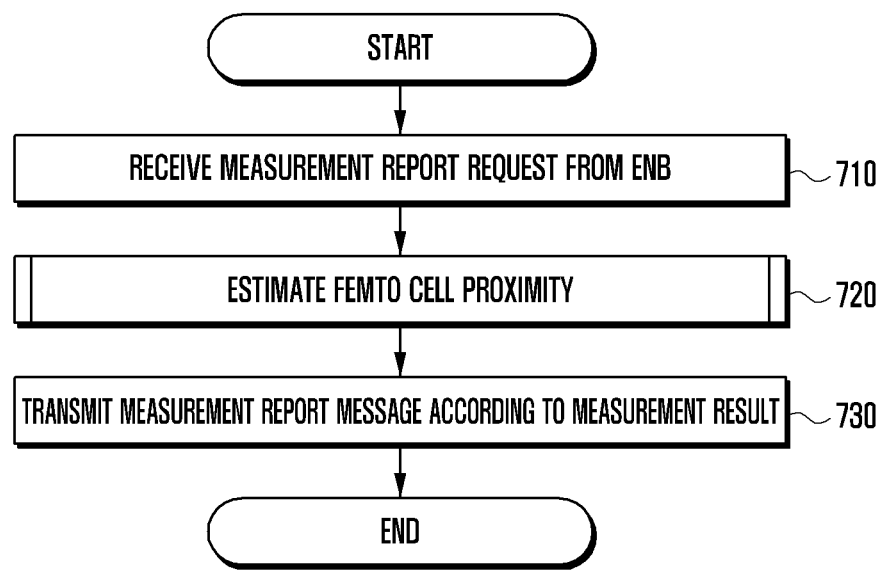
FIG. 7 is a flowchart illustrating an operation process of a UE according to an embodiment of the present disclosure.

FIG. 7 is a flowchart illustrating an operation process of a UE according to an embodiment of the present disclosure.

Referring to FIG. 7, a UE receives a measurement report request message from the eNB in operation 710. Specifically, the UE determines whether a measurement type of the measurement report request message is configured as measurement type="CSG proximity detection".

When the measurement type="CSG proximity detection", the UE proceeds to operation 720 and estimates the femto cell proximity. According to an embodiment of the present disclosure, the UE estimates the femto cell proximity based on user context information which will be described below. Further, according to another embodiment of the present disclosure, the UE may estimate the femto cell proximity based on user context information and history information. A process for estimating the femto cell proximity according to the present disclosure will be described below with reference to FIGS. 8 and 9.

The UE transmits a measurement report message to the eNB according to a result of the estimation of the femto cell proximity in operation 730. For example, when it is determined that the femto cell is near the UE, the UE transmits a measurement report message including an "entering" proximity indication to the eNB. In contrast, when it is determined that the femto cell is not near the UE, the UE transmits a measurement report message including a "leaving" proximity indication to the eNB.

Figure 8:
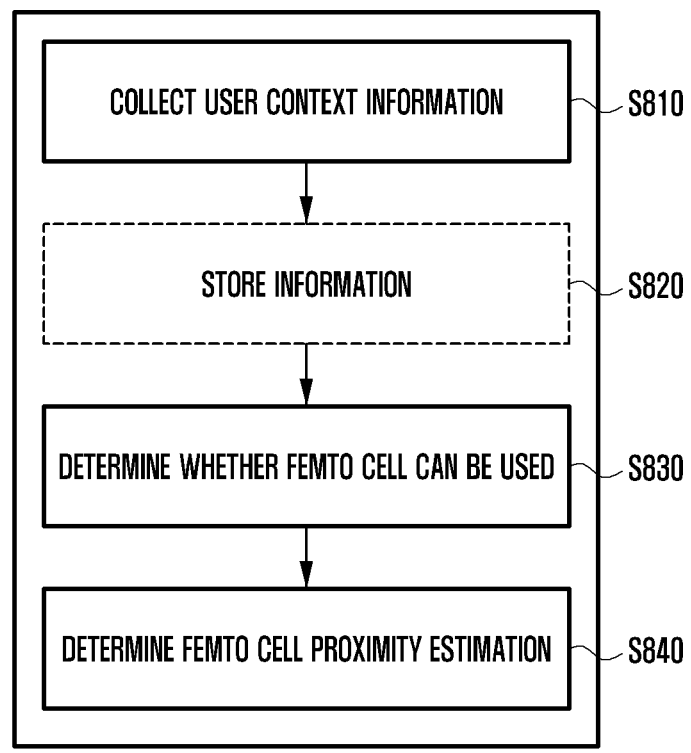
FIG. 8 is a flowchart illustrating a process of estimating femto cell proximity according to an embodiment of the present disclosure.

FIG. 8 is a flowchart illustrating a process of estimating femto cell proximity according to an embodiment of the present disclosure. Specifically, FIG. 8 illustrates an embodiment of operation 720 in FIG. 7.

Referring to FIG. 8, a UE collects user context information in operation S810. The user context information according to an embodiment of the present disclosure may include position information and time information indicating a time during which the UE stays in a place corresponding to the position information. Further, according to the intervention of the user, the user context information may further include a name corresponding to the position information and information indicating whether the femto cell is installed in a place corresponding to the position information.

Further, the UE may proceed to operation S820 and store the user context information. According to an embodiment of the present disclosure, the UE may or may not store the user context information in operation S820.

Further, the UE may proceed to operation S830 and determine whether the femto cell can be used based on the user context information. Specifically, the UE may determine whether the femto cell can be used based on the user context information and the current position of the UE. For example, when a time during which the UE stays in a particular position is longer than or equal to a preset time, the UE may determine that the possibility of using the femto cell in the corresponding position is high. Specifically, according to the user context information collected by the UE, if a condition in which the UE stays in position A for four hours or longer is repeated and a current position of the UE is position A, the UE may determine that the possibility of using the femto cell in current position A is high.

Subsequently, the UE proceeds to operation S840 to estimate the femto cell proximity based on a result of the determination of the possibility of using the femto cell and transmits a measurement report message including the estimation result to the eNB. For example, when the UE determines that the possibility of using the femto cell is high and accordingly estimates that the possibility of coming close to the femto cell is high, the UE may transmit a measurement report message including an "entering" proximity indication to the eNB. In contrast, when the UE determines that the possibility of using the femto cell is not high and accordingly estimates that the possibility of coming close to the femto cell is low, the UE transmits a measurement report message including a "leaving" proximity indication to the eNB.

Figure 9:
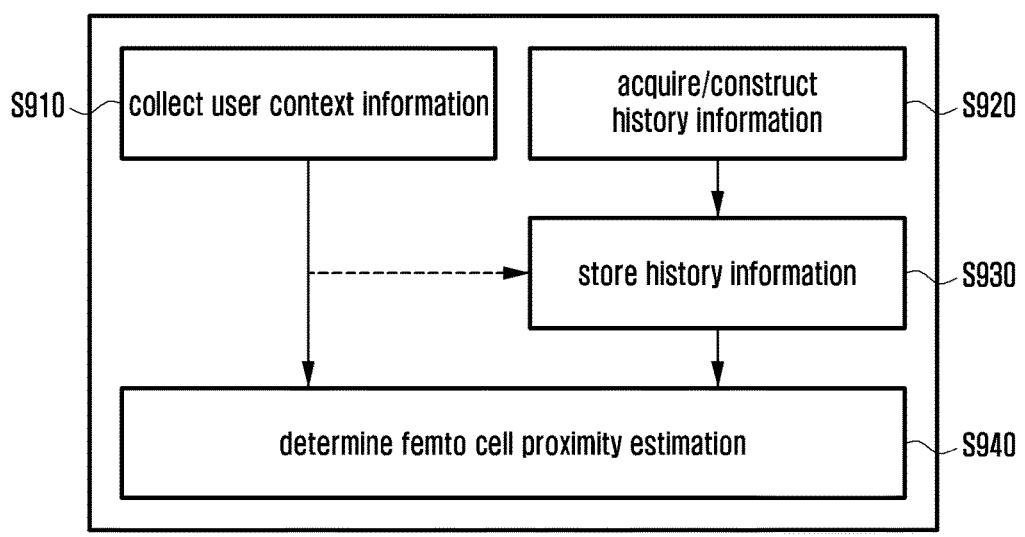
FIG. 9 is a flowchart illustrating a process of estimating femto cell proximity according to an embodiment of the present disclosure.

FIG. 9 is a flowchart illustrating a process of estimating femto cell proximity according to an embodiment of the present disclosure. Specifically, FIG. 9 illustrates an embodiment of operation 720 in FIG. 7.

Referring to FIG. 9, a UE collects user context information in operation S910. The user context information according to an embodiment of the present disclosure may include position information and time information indicating a time during which the user stays in a place corresponding to the position information. Further, according to the intervention of the user, the user context information may further include a name corresponding to the position information and information indicating whether the femto cell is installed in a place corresponding to the position information.

Simultaneously, the UE may acquire/construct history information in operation S920. The history information may include macro cell information and femto cell information corresponding to the macro cell information. For example, the history information may include information on a macro cell and femto cells located within a service radius of the macro cell. The UE may accumulate and store the history information.

Further, the UE may store the history information in operation S930. According to an embodiment of the present disclosure, in operation S930, the UE can store the user context information collected in operation S910 but does not necessarily need to do so.

Further, the UE proceeds to operation 5940 and estimates the femto cell proximity based on the user context information and the history information. The UE transmits a measurement report message to the eNB according to a result of the estimation of the femto cell proximity. For example, when it is determined that the femto cell is near the UE, the UE transmit a measurement report message including an "entering" proximity indication to the eNB. In contrast, when it is determined that the femto cell is not near the UE, the UE transmits a measurement report message including a "leaving" proximity indication to the eNB.

According to the method of estimating the femto cell proximity according to the present disclosure, there is no requirement to store information on macro cells adjacent to visited femto cells and also it is possible to increase the accuracy of the estimation of the femto cell proximity.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of estimating femto cell proximity by a User Equipment (UE) in a wireless communication system, the method comprising:
   receiving, by the UE, a measurement report request message from an eNodeB (eNB);
   estimating the femto cell proximity based on user context information; and
   transmitting, to the eNB, a measurement report message including a result of the estimation,
   wherein the user context information includes position information of the UE and time information associated with a time duration during which the UE stays in a place corresponding to the position information, and
   wherein the estimating of the femto cell proximity comprises using the time duration during which the UE stays in the place corresponding to the position information.

2. The method of claim 1, wherein the estimating of the femto cell proximity further comprises:
   identifying current position information of the UE;
   identifying time information indicating that the UE stays for a preset time or longer based on the user context information; and
   when the identified current position information of the UE corresponds to position information corresponding to the identified time information, estimating that the UE is in proximity to the femto cell.

3. The method of claim 2, wherein the estimating of the femto cell proximity further comprises, when the identified current position information of the UE does not correspond to the position information corresponding to the identified time information, estimating that the UE is not in proximity to the femto cell.

4. The method of claim 1, wherein the user context information further includes at least one of name information configured by a user in accordance with at least the position information of the UE and information indicating whether the femto cell is installed according to the position information of the UE.

5. The method of claim 1,
   wherein the estimating of the femto cell proximity further comprises estimating the femto cell proximity based on the user context information and history information, and
   wherein the history information includes macro cell information and femto cell information corresponding to the macro cell information.

6. The method of claim 1, further comprising:
   performing one of periodically and aperiodically collecting one or more pieces of data among current time data, position, movement speed data, and movement distance data through a position acquisition protocol; and
   generating the user context information based on the collected pieces of data.

7. A User Equipment (UE) for estimating femto cell proximity in a wireless communication system, the UE comprising:
   a wireless communication unit configured to transmit/receive a signal to/from an eNodeB (eNB); and
   a control unit configured to:
      receive a measurement report request message from the eNB,
      estimate the femto cell proximity based on user context information, and
      transmit, to the eNB, a measurement report message including a result of the estimation,
   wherein the user context information includes position information of the UE and time information associated with a time duration during which the UE stays in a place corresponding to the position information, and
   wherein the estimating of the femto cell proximity comprises using the time duration during which the UE stays in the place corresponding to the position information.

8. The UE of claim 7, wherein the control unit is further configured to:
   identify current position information of the UE, to identify time information indicating that the UE stays for a preset time or longer based on the user context information, and
   when the identified current position information of the UE corresponds to position information corresponding to the identified time information, estimate that the UE is in proximity to the femto cell.

9. The UE of claim 8, wherein, when the identified current position information of the UE does not correspond to the position information corresponding to the identified time information, the control unit is further configured to estimate that the UE is not in proximity to the femto cell.

10. The UE of claim 7, wherein the user context information further includes at least one of name information configured by a user in accordance with at least the position information of the UE and information indicating whether the femto cell is installed according to the position information of the UE.

11. The UE of claim 7,
   wherein the control unit is further configured to estimate the femto cell proximity based on the user context information and history information, and
   wherein the history information includes macro cell information and femto cell information corresponding to the macro cell information.

12. The UE of claim 7, wherein the control unit is further configured to:
   perform one of periodically and aperiodically collecting one or more pieces of data among current time data, position data, movement speed data, and movement distance data through a position acquisition protocol, and generate the user context information based on the collected pieces of data.

13. A non-transitory computer-readable storage medium storing instructions that, when executed, cause at least one processor to perform the method of claim 1.

* * * * *